(12) United States Patent
De Baerdemaeker et al.

(10) Patent No.: US 7,673,498 B2
(45) Date of Patent: Mar. 9, 2010

(54) SEALING PROCESS INSPECTION DEVICE

(75) Inventors: Josse De Baerdemaeker, Merchtem (BE); Bart De Ketelaere, Heverlee (BE); Bram Kamers, Linden (BE)

(73) Assignee: K.U. Leuven Research and Development, Leuven (BE)

( * ) Notice: Subject to any disclaimer, the term of this patent is extended or adjusted under 35 U.S.C. 154(b) by 0 days.

(21) Appl. No.: 10/555,459

(22) PCT Filed: May 7, 2004

(86) PCT No.: PCT/BE2004/000068

§ 371 (c)(1),
(2), (4) Date: Nov. 4, 2005

(87) PCT Pub. No.: WO2004/099751

PCT Pub. Date: Nov. 18, 2004

(65) Prior Publication Data
US 2007/0084285 A1    Apr. 19, 2007

(30) Foreign Application Priority Data
May 7, 2004    (GB) ................................. 0310425.4

(51) Int. Cl.
G01M 3/00    (2006.01)
G01D 7/00    (2006.01)
(52) U.S. Cl. ............................. 73/52; 73/587
(58) Field of Classification Search ................. 73/40, 73/49.2, 49.3, 49.8, 52, 587; 53/75, 469
See application file for complete search history.

(56) References Cited

U.S. PATENT DOCUMENTS

| | | | |
|---|---|---|---|
| 5,495,767 A * | 3/1996 | Wang et al. .................... 73/657 |
| 5,561,964 A | 10/1996 | McIntyre et al. |
| 5,821,424 A * | 10/1998 | Rodriguez .................... 73/657 |
| 6,370,084 B1 * | 4/2002 | Cray .......................... 367/141 |
| 6,371,924 B1 * | 4/2002 | Stearns ........................ 600/528 |
| 6,574,944 B2 * | 6/2003 | Capodieci ..................... 53/450 |
| 6,892,568 B2 * | 5/2005 | Witer et al. ................... 73/116 |
| 6,945,094 B2 * | 9/2005 | Eggen et al. ................ 73/54.41 |
| 7,117,912 B2 * | 10/2006 | Mister et al. ................. 156/351 |
| 2002/0072684 A1 * | 6/2002 | Stearns ........................ 600/528 |
| 2002/0121075 A1 * | 9/2002 | Schabel et al. ................ 53/469 |
| 2002/0183942 A1 * | 12/2002 | Lafleur et al. ................. 702/56 |
| 2004/0060262 A1 * | 4/2004 | Harges et al. ................. 53/434 |

FOREIGN PATENT DOCUMENTS

| | | |
|---|---|---|
| EP | 0693010 B1 | 3/1997 |
| EP | 0865989 A2 | 9/1998 |
| EP | 0950608 A1 | 10/1999 |

(Continued)

*Primary Examiner*—John Fitzgerald
(74) *Attorney, Agent, or Firm*—Browdy & Neimark, PLLC

(57) ABSTRACT

In a first object the present invention provides a method for the inspection of the quality of the sealing of a packages and more specifically the method of the present invention allows the on-line inspection of the air-tightness of a package. Said method comprising the following steps of (i) acquiring the noise signal generated by the sealing equipment during the sealing of the package, (ii) analyzing the signal in order to determine the values of at least one physical parameter characterizing the noise signal and (iii) deciding on the quality of the sealing by comparing the determined value to a reference value for said physical parameter.

20 Claims, 7 Drawing Sheets

FOREIGN PATENT DOCUMENTS

Figure 1:
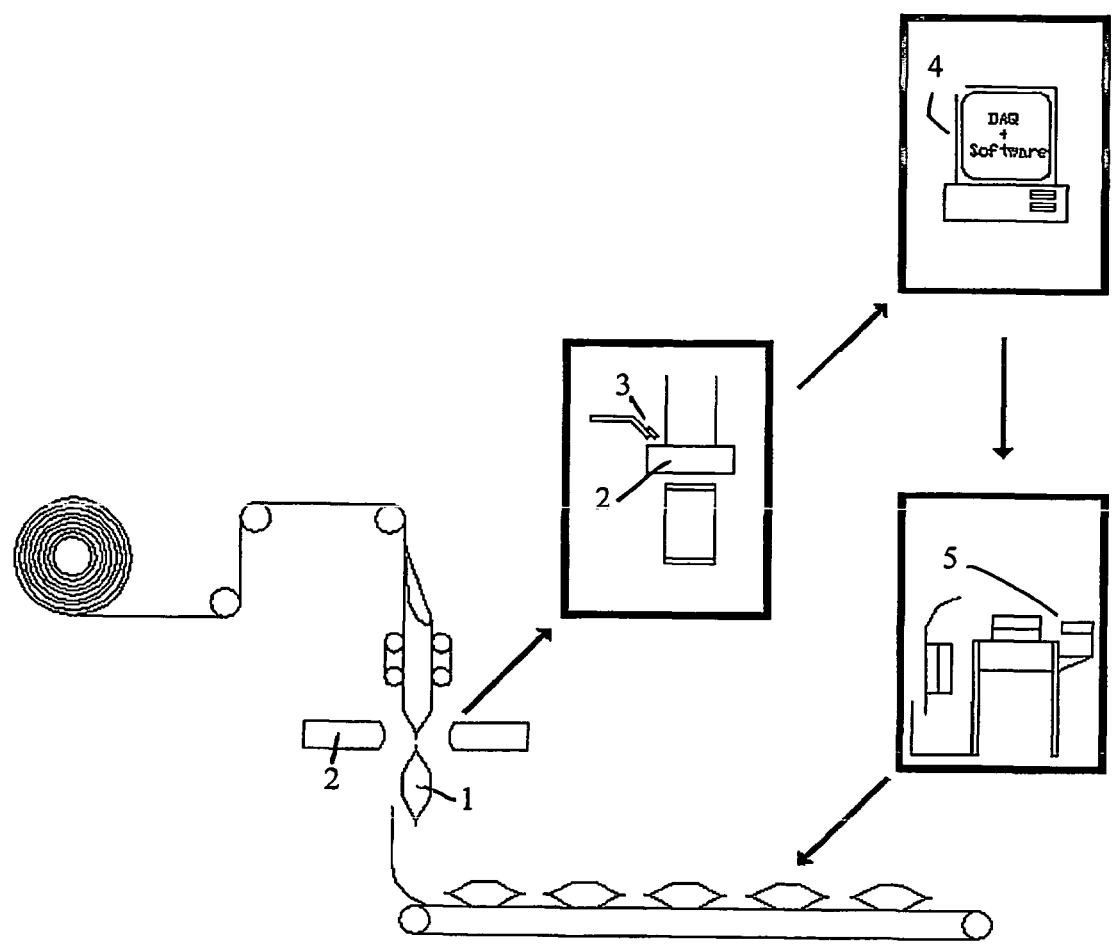

| | | |
|---|---|---|
| EP | 1324014 A1 | 7/2003 |
| JP | 9226708 | 9/1997 |
| JP | 10-339684 A | 12/1998 |
| JP | 2001-066215 A | 3/2001 |
| JP | 2001240024 | 9/2001 |
| WO | EP 693010 B * | 10/1994 |
| WO | WO 02/092439 A2 | 11/2002 |

* cited by examiner

SEALING PROCESS INSPECTION DEVICE

FIELD OF THE INVENTION

The present invention relates to a method and a device for the on-line monitoring of the seal quality of a package.

BACKGROUND OF THE INVENTION

A broad range of products is packed in airtight conditions in order to prolong shelf life, to guarantee its quality, or to preserve its sterility. Such products range from food and beverages to medical, electrical and pharmaceutical items being liquids, solids, gasses, or a combination thereof. A crucial point in the packaging process is to ensure a high quality sealing of the package. Seal quality encompasses several issues such as airtightness, inclusions, strength and visual appearance. If the seal does not meet the quality requirements, the product can be rejected by the consumer based on the visual appearance of the package, or in case of no airtightness, the quality of the product inside the package could rapidly deteriorate in terms of visual appearance, flavor, mouth feel, sterility and microbial safety and, hence, consumer health. Inappropriate seal quality is a frequently occurring problem in the packaging industry. Given that a defective seal often leads to the rejection by the consumer of the packaged product, the packaging industry is particularly sensitive to this problem. In many cases the monitoring of the individual packages is still performed manually, which is a tiresome and unpleasant occupation. It is an aim of the present invention to provide an inspection device for the on-line monitoring of the seal quality of different types of packages and more particularly of packages processed using a heat seal process.

During the process of heat sealing, the (two or more) thermoplastic films of a package are brought in contact with each other, and the temperature is increased so that fusion of the films is achieved. The films are brought into contact and pressure is exerted on them by positioning the films between two or more sealing bodies that are pressed against each other. Different mechanisms to move the sealing bodies are used in practice, such as rotating shafts, or pneumatic/hydraulic cylinders. Also the methodology used to increase the temperature can vary from one type of equipment to another. It can be achieved by rotating wheels, by resistance elements, dielectric or by ultrasonic vibrations, amongst others. Since the sealing process always involves a movement of at least one of the sealing bodies, wearing of the machinery is inevitable. This degree of wearing (for instance in the bearings or on the sealing bodies) affects the characteristics of the sealing process and the state of the machinery needs to be monitored adequately. The quality of the sealing is also influenced by the temperature of the process, the pressure exerted on the thermoplastic films, the cleanness of the sealing bodies, the positioning of the films relative to the sealing bodies, the quality of the film and the material to be packaged. Besides these factors, the presence of foreign bodies in between the thermoplastic films, or between the films and the sealing bodies, clearly affects the seal quality. This high number of dynamic variables affecting the operation and efficacy of the sealing equipment precluded the prediction of the seal quality based on the monitoring of the behavior of the sealing device at the moment of sealing. Indeed, the different seal inspection systems that are commercially available evaluate the seal quality based on the monitoring of the characteristics of the package. Three types of such inspection devices can be discriminated: (1) A sealing inspection system based on applying a nondestructive pressure on the package and to repeat this measure at two different times. When the package is not airtight, a difference in reading between these two moments will be noticed due to the fact that air has moved out of the package [Packaging Technologies & Inspection, http://www.ptipacktech.com/inspection/foodpackages/pressuretesting.cfm]. (2) A camera vision inspection system in which an image of the package or seal is taken and analysed [Perceptics, http://www.perceptics.com/sealsafe_pouch.html]. (3) An ultrasonic inspection system that generates a fingerprint of the seal [Packaging Technologies & Inspection, http://www.ptipacktech.com/inspection/foodpackages/sealintegritytesting.cfm].

Next to the above-mentioned systems, JP2001240024 describes a system for the detection of the squeezing of an article to be packaged between the sealing elements of a bag-making filling machine. The squeezing of the product to be packaged is detected by analysing the acoustic signal emitted by the product to be sealed at the moment of sealing. More specifically, the sound pressure level within a specified frequency of the acoustic signal is compared to a fixed reference value. When the measured sound pressure value exceeds the fixed reference value the device considers that a squeezing of the product occurred during the sealing process. Essentially, the device of JP2001240024 discriminates between the acoustic signal associated with the normal operation of the sealing device and the acoustic signal associated with the squeezing of a product between the sealing elements.

The present invention provides a system for the on-line inspection of the quality of the sealing of packages based on the observation of the behavior of the sealing bodies during the sealing process. The system has the advantages that it can easily be applied on different types of heat seal equipment and that it takes into account the variation of the behavior of the sealing bodies related to the wear of the equipment, the variation of the package quality, the variation in the positioning of the package in the sealing device, etc. . . . Moreover, the flexibility and sensitivity of the system of the present invention allows the systematic and consistent detection of minor anomalies in the sealing process. The anomalies detected in the sealing process can be extrapolated towards a prediction of the quality of the seal. This information is then used to decide whether or not the seal quality of a given package allows further processing and distribution of said package.

SUMMARY OF THE INVENTION

The present invention provides a method for the on-line inspection of the seal quality of packages, which are processed using sealing equipment comprising at least two colliding sealing bodies, such as heat seal equipment. The assessment of the seal quality is based on the observation of the sealing and more particularly the behavior of the sealing bodies during the sealing of a package. In a preferred embodiment the behavior of the sealing is described using parameters characterizing the vibration of the sealing bodies. The data on the vibration of the sealing bodies can be acquired using a microphone, an accelerometer or a laser vibrometer.

In a second object the invention provides a device, which can be used to monitor the seal quality according to the method of the present invention. This device comprises a sensor allowing the acquisition of the data related to the behavior of the sealing bodies during the sealing of a package, said sensor being connected to a computing unit which processes the acquired data in order to predict the seal quality of said package. In a preferred embodiment the sensor is either a microphone, a laser vibrometer or an accelerometer.

DETAILED DESCRIPTION OF THE INVENTION

List of Figures

FIG. 1: Figure of the sealing equipment and the inspection device showing the sealed packages (1), the sealing bodies (2), the microphone (3) and the computing unit (4). The figure also provides an example of a rejection device (5), which eliminates the packages having a low quality seal from the production line.

Figure 2:
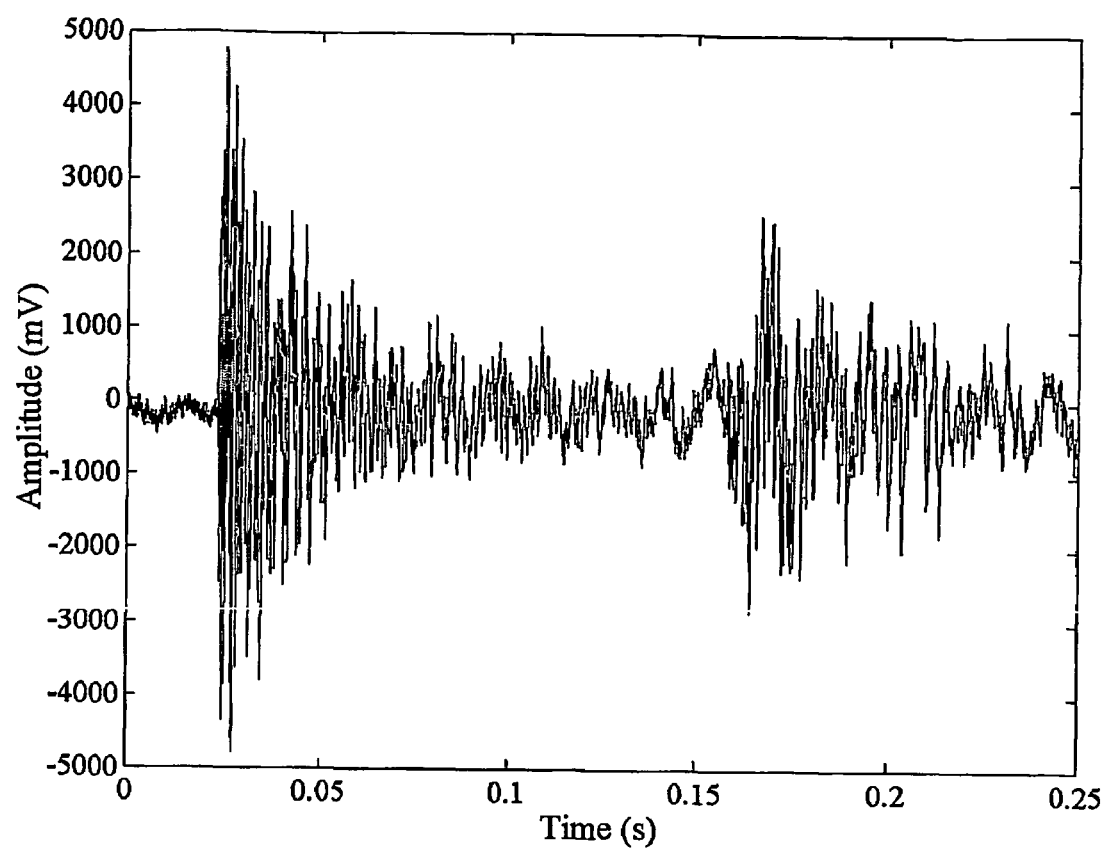

FIG. 2: Example of a time signal during and after the sealing operation.

Figure 3:
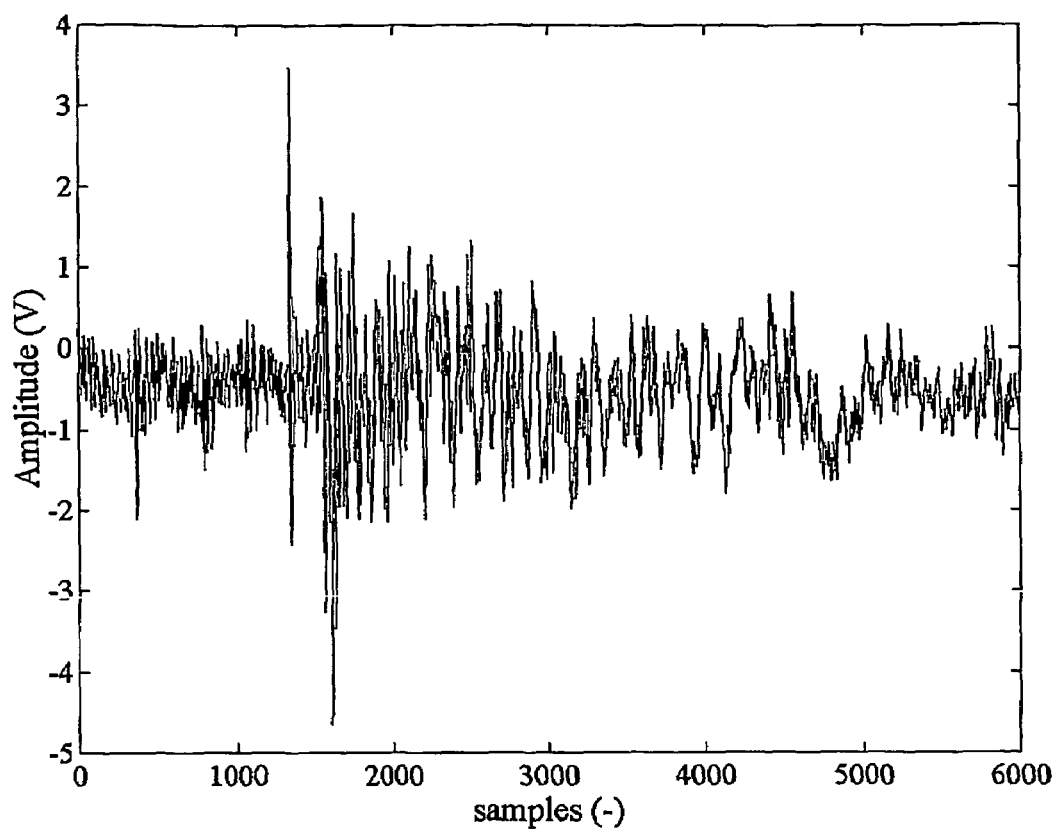

FIG. 3: Characteristic time signal associated with a good quality seal.

Figure 4:
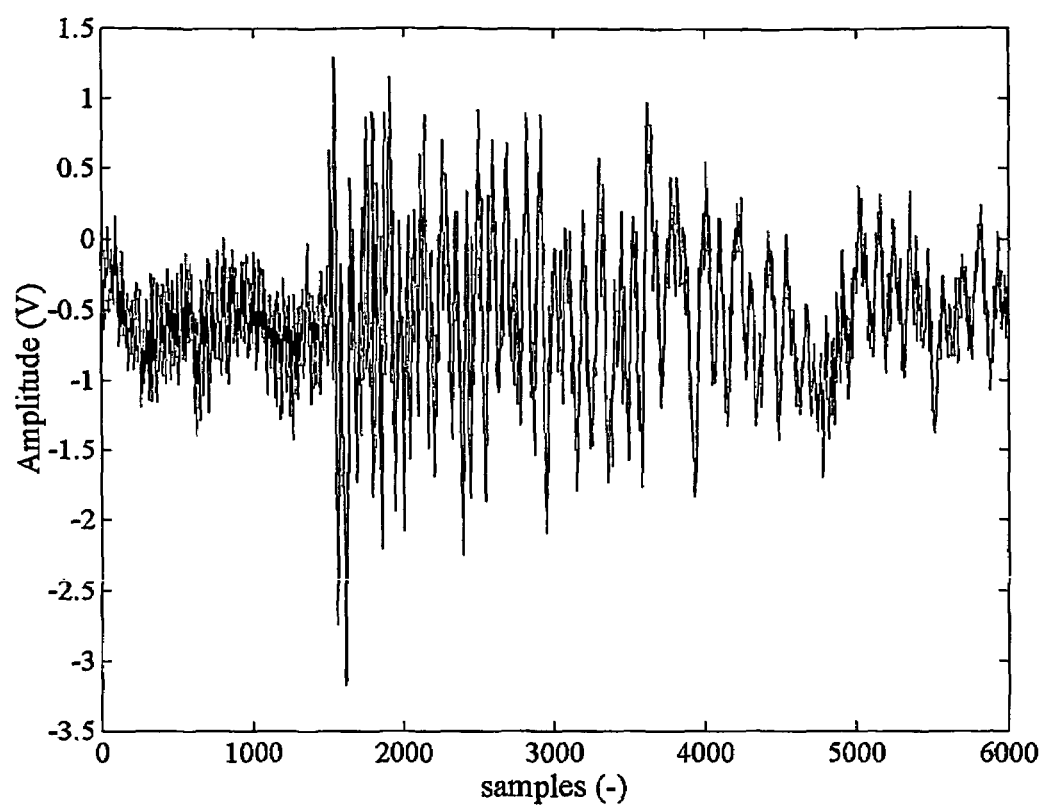

FIG. 4: Characteristic time signal associated with a bad quality seal.

Figure 5:
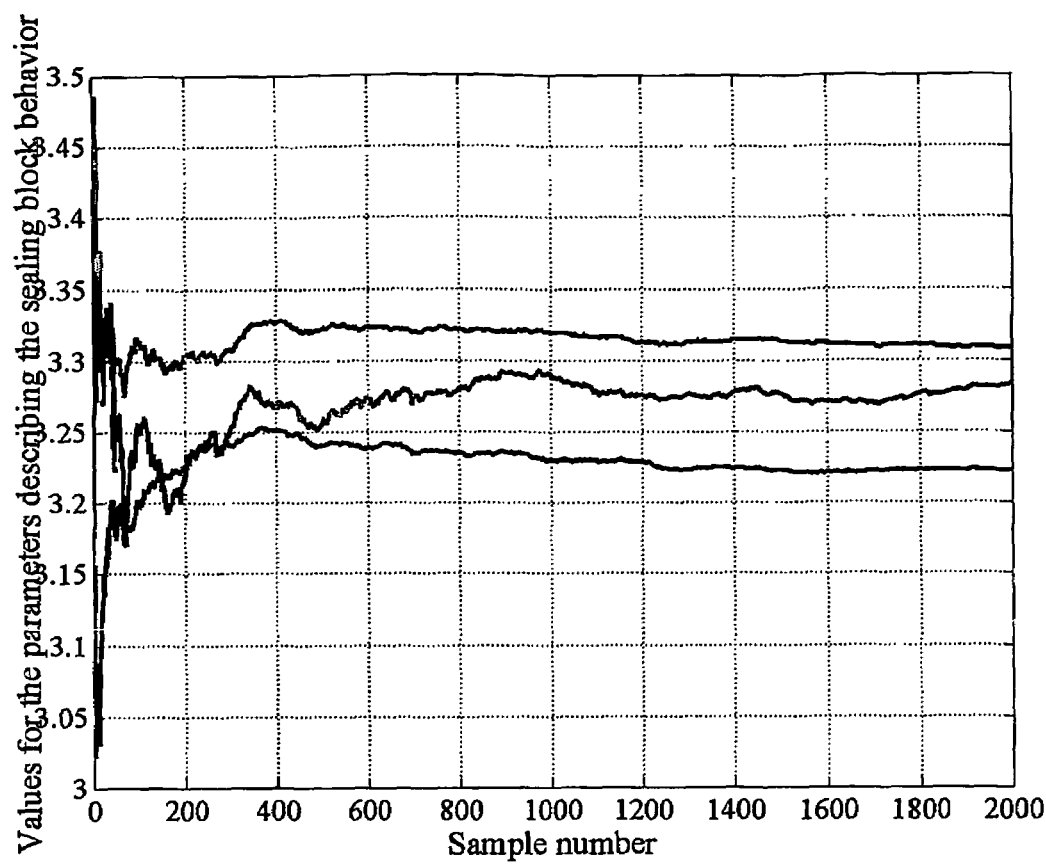

FIG. 5: The dynamics of the sealing process as it is captured by the self-learning system. The figure shows how the average characteristics of a good seal evolve during the process. A similar pattern is seen for the covariance updates.

Figure 6:
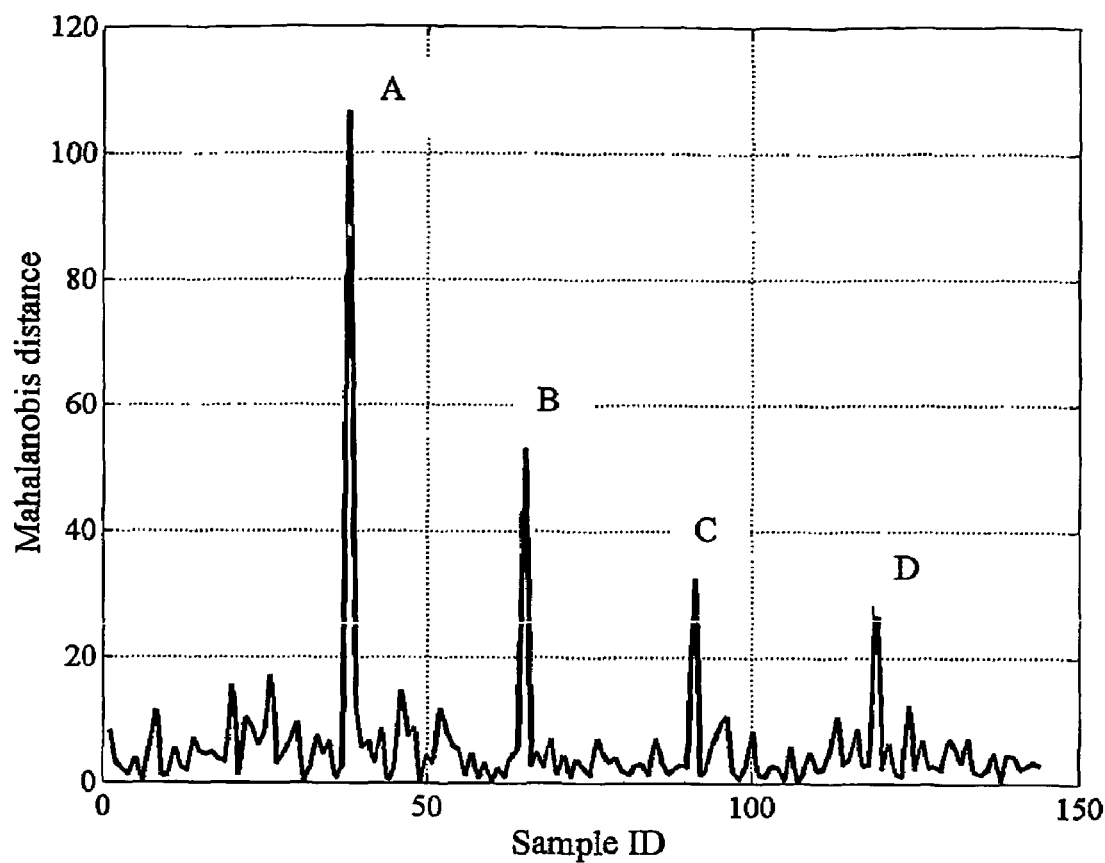

FIG. 6: Mahalanobis distances, indicating how far the quality of a current seal is distant from a good quality. Values for a process with optimal conditions.

Figure 7:
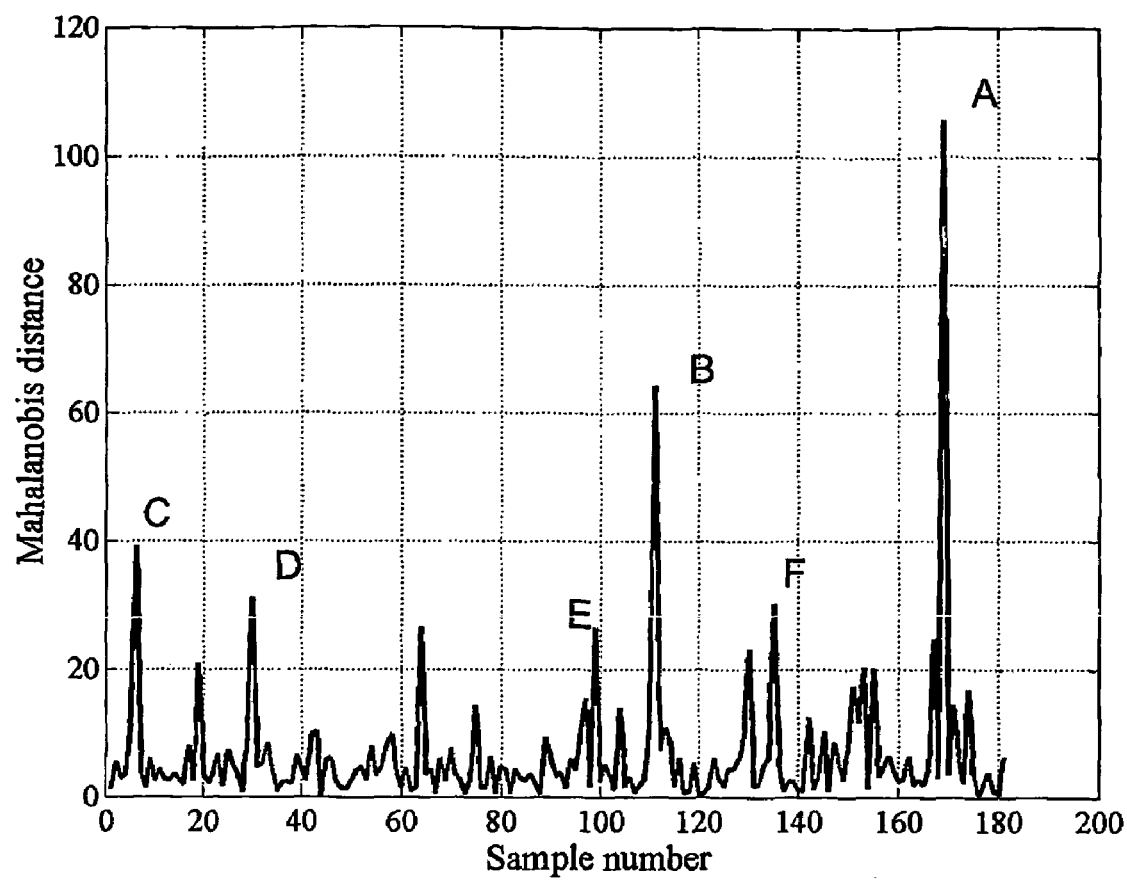

FIG. 7: Mahalanobis distances, indicating how far the quality of a current seal is distant from a good quality. Values for a process with sub-optimal conditions.

DESCRIPTION

The system of the present invention allows the on-line detection of the occurrence of anomalies during the sealing process of packages. The anomalies detected in the sealing process can be extrapolated towards a prediction of the quality of the seal. In a preferred embodiment the system is applied to detect sealing anomalies during the sealing of packages using a sealing mechanism, which comprises two sealing bodies, of which at least one is moveable, that are pressed against each other at the moment of sealing, and between which at least a part of the package to be sealed is positioned. Different systems that drive the sealing bodies exist, such as a rotary shaft, or a pneumatic/hydraulic cylinder. In a more preferred embodiment the inspection system of the present invention is used to monitor the seal quality of packages sealed in a heat seal process. Particular examples of heat seal equipment manufacturers are Rovema (VPK continuous motion bagger), Robert Bosch (SVE 2510 AB), Toyo Jidoki (TT-9CW), Sig Pack Systems (SIG BZx), Sharp (SX bagger) and Mitsubishi.

In order to detect anomalies in the sealing process the inspection system uses data on the behavior of the sealing bodies at the moment of sealing. Typically, the behavior of the sealing bodies is monitored by measuring the acoustic signal emitted by the sealing bodies or the vibration of the sealing bodies during the period of sealing. The emitted acoustic signal can be captured using a microphone, while the vibrations of the sealing bodies can be monitored using an accelerometer and/or a laser vibrometer. The measurement of the acoustic signal or vibration is referred to as the data acquisition process. A computing unit analyses the data acquired during the data acquisition process and provides one or more values for at least one physical parameter characterizing the behavior of the sealing bodies. Comparison of the determined values for a given package with a set of reference values allows predicting the seal quality of said package. In case the determined values fall outside of the range of the reference values the quality of the sealing is considered to be inferior to the desired quality. A major advantage of the present invention is that the user should not predefine the reference values associated with a desired seal quality, but that a self-learning algorithm generates these values whatever packaging device or packaging material is used and whatever product is packaged. The self-learning algorithm monitors the variation of the behavior of the sealing bodies over a period of time and provides the average and distribution around this average of the parameters describing the behavior of the sealing bodies. In a preferred embodiment the monitoring of the behavior of the sealing bodies is a dynamic process allowing the dynamic updating of the average and distribution of the parameters describing the behavior of the sealing bodies. The above mentioned reference values for evaluating the quality of the sealing process are calculated using the data on the average and distribution of the parameters describing the behavior of the sealing bodies. Preferably, the reference values are continuously updated in accordance with the evolution of the data on the average and distribution of the parameters describing the behavior of the sealing bodies. In a preferred embodiment, the user of the inspection device enters into the computing unit a value corresponding with a maximal accepted deviation from the optimal sealing quality. Thereafter, the computing unit translates this value into one or more reference values using the data on variation of the behavior of the sealing bodies and thereafter dynamically updates these reference values according to the evolution in time of the variation of the behavior of the sealing bodies.

In a preferred embodiment the data acquisition process is triggered by an external or internal signal indicating the initiation of the sealing of a package. In a preferred embodiment the signal is generated by the packaging device.

In a preferred embodiment the system of the present invention comprises a device allowing the evacuation of a package when the computing unit decides that the sealing quality of said package is inferior to the desired sealing quality. This is when the values for the parameters describing the behavior of the sealing bodies at the moment of the sealing of said package are not within the range of the reference values.

As indicated the inspection device is particularly suited for the monitoring of the seal quality of packages sealed using equipment comprising two sealing bodies and more particularly using heat-seal equipment. Such products range from food and beverages to medical, electrical and pharmaceutical items being liquids, solids, gasses, or a combination thereof. A crucial point in the packaging process is to ensure an appropriate seal quality of the package. Seal quality encompasses several elements such as airtightness, inclusions, strength and visual appearance. Depending on the nature of the product to be packaged the quality of the sealing is more or less important. For example, products that have to be maintained in a surrounding gas also contained in the package certainly require an airtight seal and in consequence a stringent monitoring of the seal. Other packaged products do not require a very high quality of the package seal. The inspection device of the present invention can easily and without undue experimentation be adjusted in order to allow a more or less stringent monitoring of the sealing quality depending on the nature of the product to be packaged. In the same way the stringency of the monitoring of the seal quality can be adjusted according to the quality of the packaging material. For example, when a packaging material of higher quality is introduced in the packaging unit the stringency of the monitoring of the sealing inspection can be increased resulting in an overall increase of the quality of the sealing while maintaining the number of rejected packages at the same level.

Different types of packages that are sealed can be inspected with the present invention. For food and beverages, the most common sealed packages are retort pouches, pillow bags, stand up pouches, among others. For medical purposes, the most widely used manufacturer of heat sealed bags is Baxter. In the pharmaceutical industry, the most common type is the blister package.

The system of the present invention can be used to monitor the packaging of liquid, solid or gas products or combinations of such products. Moreover, the system is suitable for the monitoring of the sealing of packages containing a combination of products having different natures. In a particular embodiment the device of the present invention is used to monitor the sealing of packages containing liquids. It was observed that the presence of an amount of liquid between the films of the package to be sealed results in a damping of the vibration of the sealing bodies. This change in the behavior of the sealing bodies can be monitored and related to resulting seal quality using the system as described above.

The system of the present invention can also be used to monitor the sealing operation conditions. As the system continuously updates the average and the range of the parameters characterizing the behavior of the sealing bodies, these values can provide an indication regarding the overall operation conditions. For example, after a prolonged operation of the sealing system, the operation conditions can become sub-optimal due to the wear of the sealing bodies. This wear will result in the change of the average and range of the parameters describing the behavior of the sealing bodies. Based on these changes the degree of the wear of the sealing bodies can be estimated. However, the behavior of the sealing bodies can also be affected by factors external to the sealing device. When a change in the environment of the sealing device influences the behavior of the sealing bodies, the average and range of the parameters characterizing their behavior are also affected. These changes can then be brought to the attention of the operator of the sealing device, f.ex. using the display of the computing unit.

The illustrative embodiment presented below further exemplifies the present invention and is a part of the description of the invention.

Illustrative Embodiment

A sealing device comprising a seal inspection system according to the present invention was constructed (FIG. 1). This set-up comprised the following elements:

1. The Sealing Device

The sealing mechanism (ROVEMA, VPK continuous motion bagger type 360) comprises two sealing bodies that touch each other at the moment of sealing, and between which the package to be sealed is positioned. To evaluate the quality of the seal of a given package, the behavior of the sealing bodies was monitored during the sealing period, i.e. the period during which the two moving sealing bodies collide. In this particular example the acoustic signal emitted during the sealing period was used to monitor the behavior of the sealing bodies. However, the person skilled in the art will understand that the acoustic signal emitted by the sealing bodies reflects the vibrations of the sealing bodies. Therefore, an alternative for the measurement of the acoustic signal is to measure the vibrations of the sealing bodies using for example an accelerometer or a laser vibrometer.

2. Sensor Positioning and Data Acquisition Hardware

The sensor was placed in the vicinity of the sealing bodies (in case of a microphone), attached to the sealing bodies (in case of an accelerometer), or directed to the sealing bodies (in case of a laser vibrometer) of the sealing device. As mentioned above a microphone was used in this particular embodiment.

An external triggering signal was used in order to time the acquisition of the signals. This triggering ensures that at any time the signal originating from the sealing process is analysed, and not any other signal or disturbance. An internal trigger signal of the ROVEMA device that initiates the sealing process was used.

After triggering, the signal captured by the microphone was amplified and fed to a data acquisition board connected to a digital processing unit such as a personal computer for further analysis. The data were acquired with a sampling frequency that was chosen so that the whole range of noise originating from the sealing bodies could be captured. This range depends on the sealing bodies under study. In this particular embodiment, a sampling frequency of 50 kHz was chosen for the set-up of this application. As the acoustic signal emitted by the sealing bodies is generally within the audible range, the sampling frequency should be at least 100 Hz, but preferably above 10 kHz in order to capture a sufficient broad range of the audible spectrum.

3. A Computing Unit Performing the Analysis and Interpretation of the Acquired Signal 3.a. Signal Analysis The signals captured by the microphone were analysed on a digital processing unit such as a personal computer. The data analysis comprised the following steps:

1. Filtering of the acquired signal to enhance the signal-to-noise ratio. The filter characteristics are dependent on the type of package to be sealed, on the type of sensor used, and on the sealing device itself.
2. Determination of that part of the signal that holds information about the sealing process itself. This decision was made by analysing the sealing mechanism together with the acquired signal. An optimal record length, with a corresponding optimal number of data points, was defined. In this particular embodiment the observed duration of the sealing process was 150 ms.
3. Data compression step: Calculation of at least one physical parameter characterizing the behavior of the sealing bodies. In its most simple form, the energy content of the signal in a pre-defined frequency range that was set by filtering was used.

3.b. Interpretation of Signals

The physical parameters characterizing the behavior of the sealing bodies are then fed to a self-learning algorithm, such as a neural network, a recursive least squares model, etc. For a given sealing device and package to be sealed, a prior probability of the parameters is entered once. This prior probability can be based on prior knowledge about the sealing block behavior. For the assessment of the quality of the seal of the first package, the prior probability is used. From then on, learning starts and the prior probability is updated. The self-learning system continuously monitors the actual behavior of the sealing bodies and 'learns' this behavior in case of a good seal by updating the average physical parameters of such a good seal, and how these values are dispersed around the average. The algorithm produces a set of values that indicate how far the actual seal quality is located from a good seal. The operator only needs to enter into the computing unit in a threshold value l that relates to the severity of defects that need to be downgraded.

In the preferred embodiment, each acquired signal was compressed into a small number of relevant physical parameters describing the behavior of the sealing bodies, as described above. This is referred to as the feature vector. These parameters are then used in an adaptive, on-line, self-learning algorithm as follows:

1. Initialize the average feature vector. This initialization step can be based on previous knowledge and only needs to give a very rough idea on the values that are to be expected for a given type of sealing device. It only needs to be set once.
2. Initialize the feature vector inverse covariance matrix. This initialization step can be based on previous knowledge and only needs to give a very rough idea on the values that are to be expected for a given type of sealing device. It only needs to be set once.
3. Present a new feature vector, corresponding to the sealing of a package.
4. Calculate the Mahalanobis distance M as follows:

$$M=(x-m)^T C(x-m)$$

where M=Mahalanobis distance, x=new feature vector; m=average feature vector, C the inverse covariance matrix.

5. In case the Mahalanobis distance exceeds a threshold l, the seal quality of the package under study is considered as 'low quality'. In this case, the inverse covariance matrix nor the average feature vector are updated. The actual value of the Mahalanobis distance indicates the severity of the defect. The bound l is determined using the theoretical distribution of the Mahalanobis distance, being a Chi square distribution, with the degrees of freedom equal to the number of elements in the feature vector.
6. In case the Mahalanobis distance is lower than the bound l, the inverse covariance matrix and the average feature vector are updated. The average feature vector is updated as $$m=((n-1)m+x)/n$$

where n denotes the number of good seals considered thus far +1. A factor determining the upper bound of n can be introduced serving as a forgetting factor. An extra factor setting the importance of each sample in the calculation of m can be used. The inverse covariance matrix is updated using the matrix inversion lemma which results in:

$$P=P-Px(1+x^T Px)^{-1} x^T P$$

with P an intermediate matrix from which $$C=Pn$$

4. Package Rejection Unit

Once the classification unit gives a signal that the protected quality of the seal of a package is lower than the desired quality, a signal is fed to a delay unit coupled to a rejection device such as a pneumatic valve. This delay unit delays the rejection signal a pre-set number of seconds so that it opens the valve at the moment the bad package is in front of the valve. The opening time of the valve can be adjusted so that the package is removed from the production line.

EXAMPLE 1

Performance of the Inspection Device when Monitoring the Sealing of Packages Processed on a Sealing Device Used for the Packaging of a Crisp-Like Snack A typical example of an acquired signal originating from the sealing device (ROVEMA, VPK continuous motion bag-ger type 360) is given in FIG. 2 in case of a 'good' sealing of a package. After acquisition, the signal was filtered in order to remove unwanted contributions. Two clearly distinct noise patterns were observed.

The first part of the signal is associated with the start of the sealing process, at the moment that the two sealing bodies (FIG. 1, part 2) touch each other. The second part of the signal is due to the opening of the sealing bodies, and only occurs after the sealing process has ended. As such, the second part was not used for further analyses and prediction. FIG. 3 represents a typical pattern associated with a good seal, while FIG. 4 represents a pattern associated with a low quality seal.

From this remaining part, the (one or more, depending on the actual application) feature(s) are calculated and from the updated mean vector and covariance matrix the Mahalanobis distance was calculated. The features used in this particular example are the energy contents in three specific frequency bands in the audible range, as estimated using a frequency analysis.

FIG. 5 presents the change in mean vector as given by the self-learning algorithm as a function of sample number. Also the covariance matrix is updated with the algorithm. The actual value of the Mahalanobis distance is a sensitive indicator for the seal quality. The higher its value, the more the considered seal deviates from what is learned as being a 'good' seal. Following figures describe two different moments in the actual production run. FIG. 6 relates to the start of a production run, when there is only limited disturbance of dust, while FIG. 7 relates to the end of a production run where the amount of dust surrounding and on the sealing device was substantially higher.

Sample 'A' in FIG. 6 had a major quality deficit (open seal due to a foreign particle that was located in between the sealing elements at the moment of sealing). Sample B had small sized particles in the sealing region. Samples C and D only had minor quality deficiencies, bad positioning of the foil and the presence of dust in the seal, respectively. These deficiencies do not result in the instant loss of airtightness, but do increase the probability thereof during further handling and shipment. These 4 seals clearly produce a different pattern from that of the good seals.

After a prolonged production run and the associated presence of significant amounts of dust the incidence of bad (or lower quality) samples can increase. Such an example is given in FIG. 7. In that particular setting, sample A had a major quality deficiency, an open seal due to a foreign particle that was located in between the sealing elements at the moment of sealing while sample B had a seal that was not airtight because of the combination of small inclusions and dust. Samples C and D had only minor quality deficiencies, these seals were airtight, but they were weak due to the presence of a given amount of dust in the seal. Besides these seals, there are numerous samples such as E and F for which the seal quality is lower but the amount of dust in the seal region is lower than in case of C and D. This particular case illustrates that the inspection device of the presence invention can be used to track the status of the packaging process. In a particular embodiment the inspection system warns the operator that the operation conditions have become sub-optimal based on the observation that an increasing number of seals are associated with values deviating from the average. Such sub-optimal conditions can be related to factors internal to the sealing device, such as the wear of the sealing equipment or can be external to the sealing device, for example the presence of dust.

EXAMPLE 2

Algorithm for the Interpretation in Case Only One Parameter is Used for the Characterisation of the Behavior of the Sealing Bodies In the case only one relevant parameter is used, the method described above can be further simplified as follows:

Each acquired signal is compressed into an energy content number as described above. This energy content number is then used in an adaptive self-learning classification algorithm as follows:

1. Choose the history length n: This number defines the number of past energy contents that has to be remembered, and that will be used to compare future energy contents.
2. Acquire a new signal $y_{new}$ and calculate the energy content $e_{new}$. This energy content can be defined, for instance as the variance of the signal.

The energy content of the filtered noise signal was defined as $s^2$ $$s^2 = \frac{1}{m}\sum_{i=1}^{m}(y_i - \text{mean}(y))^2$$

with m the number of analysed points in the signal and mean(y) the mean value of the signal.

3. Calculate the x % extreme bound $l_x(t)$ of the energy content based on the n previous samples. The index t was used to stress that the extreme bound is a function of the process time. As such, the extreme bound adapts itself during the process and robustifies the algorithm against process changes. This extreme bound calculation is based on the statistical distribution of the n energy content numbers. The x can be used to control/define the theoretical incidence of false rejects that can be expected. Depending on the application, this can be the upper or lower bound or both.
4. Compare $e_{new}$ to $l_x(t)$.

Classify the new package as having a low quality seal if $e_{new}<l_x(t)$ or $e_{new}>l_x(t)$, depending on the application. Else, accept the package as 'correctly sealed'. In the example outlined here, the lower bound was taken.

The invention claimed is:

1. A method for the inspection of the seal quality of packages sealed using heat seal equipment comprising at least two colliding sealing bodies comprising monitoring vibration of the at least two colliding sealing bodies during sealing of the packages and deciding seal quality of the packages based on said monitoring, wherein said method comprises:
   (i) acquiring data on the vibration of the at least two colliding sealing bodies during the sealing of the packages,
   (ii) calculating an average and distribution of at least one parameter characterizing the vibration of the at least two colliding sealing bodies using at least a selection of the data of step (i),
   (iii) calculating reference values for the at least one parameter characterizing said vibration using the average and distribution determined in step (ii), said reference values being associated with a minimal acceptable seal quality,
   (iv) acquiring data on the vibration of the at least two colliding sealing bodies during the sealing of a given package and determining values of the parameters characterizing the vibration during the sealing of said package,
   (v) comparing the values determined in step (iv) with the reference values in order to decide on the quality of said package, and
   (vi) continuously updating the calculated reference values in step (iii) in accordance with an evolution of the data on the average and distribution of the parameters in step (ii) characterizing the vibration of the colliding sealing bodies.

2. The method according to claim 1, wherein only the determined values that are within the range of the reference values are used for the calculation of the average and distribution of the at least one parameter describing the vibration of the at least two colliding sealing bodies during the sealing of the packages.

3. The method according to claim 1 wherein the data on the vibration of the sealing bodies is acquired using a laser vibrometer pointed on a sealing body.

4. The method according to claim 1 wherein the data on the vibration of the sealing bodies is acquired using an accelerometer mounted on a sealing body.

5. The method of claim 1 for the monitoring of the seat quality of packages selected out of the group consisting of pouches, pillow bags, stand up pouches and blister packages.

6. The method of claim 1 wherein the packages contain a solid, a liquid, a gas or a combination thereof.

7. The method according to claim 1 wherein the monitoring of the vibration comprises monitoring physical movement of the colliding bodies.

8. The method for the inspection of the seal quality of packages sealed using heat seal equipment comprising at least two colliding sealing bodies according to claim 1, said method further comprising monitoring acceleration of the at least two colliding sealing bodies during the sealing of the packages and deciding the seal quality of packages based on said monitoring, wherein said method monitors damping of the vibration of the at least two colliding sealing bodies during the sealing and correlates such damping to the resulting seal quality.

9. The method according to claim 1, wherein the calculation of the reference values takes into account a value corresponding to an acceptable deviation from the average sealing quality.

10. The method according to claim 9 wherein the value corresponding to an acceptable deviation from the average sealing quality is pre-set.

11. The method according to claim 9 wherein the value corresponding to an acceptable deviation from the average sealing quality can be modified according to the desired stringency of the monitoring of the seal quality.

12. The method according to claims 1 or 2, wherein one or more weighing factors establish the weight of the values determined during the sealing of a given package in the calculation of the average and distribution of the at least one parameter characterizing the vibration of the at least two colliding sealing bodies during the sealing of said packages.

13. The method according to claim 12 wherein the calculation of the reference values takes into account a value corresponding to an acceptable deviation from the average sealing quality.

14. The method according to claim 12 wherein the weighing factors lower the weight of the values determined during the sealing of a previous package as compared to the parameters determined during the sealing of the last sealed package.

15. The method according to claim 14 wherein the calculation of the reference values takes into account a value corresponding to an acceptable deviation from the average sealing quality.

16. A device for the inspection of the seal quality of packages sealed using heat seal equipment according to the method of claim 1, said device comprising at least two colliding sealing bodies and at least one accelerometer mounted on a sealing block, said accelerometer being connected to a computing unit.

17. A device for the inspection of the seal quality of packages sealed using heat seal equipment according to the method of claim 1, said device comprising at least two colliding sealing bodies and at least one laser vibrometer pointed on a sealing block, said laser vibrometer being connected to a computing unit.

18. The device according to any of the claims 16 or 17 wherein the device comprises a rejection unit allowing the rejection of the packages having a low quality seal.

19. The device of any of the claims 16 or 17 for the monitoring of the seal quality of packages, wherein the packages are selected from the group consisting of pouches, pillow bags, stand up pouches and blister packages.

20. The device of any of the claims 16 or 17 wherein the packages contain a solid, a liquid, a gas or a combination thereof.

* * * * *